(12) United States Patent
Hansen

(10) Patent No.: US 6,263,033 B1
(45) Date of Patent: Jul. 17, 2001

(54) BAUD RATE GRANULARITY IN SINGLE CLOCK MICROCONTROLLERS FOR SERIAL PORT TRANSMISSIONS

(75) Inventor: John P. Hansen, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/037,148

(22) Filed: Mar. 9, 1998

(51) Int. Cl.[7] .................................................. H04L 25/38
(52) U.S. Cl. .......................... 375/370; 370/305; 370/470; 370/506
(58) Field of Search ..................... 375/369, 370; 370/300, 304, 305, 506, 298, 299, 301, 469, 470

(56) References Cited

U.S. PATENT DOCUMENTS

| | | | |
|---|---|---|---|
| 3,680,057 | * 7/1972 | Blessin et al. | 360/172.5 |
| 4,210,777 | * 7/1980 | Bowerman et al. | 375/117 |
| 4,700,358 | * 10/1987 | Duncanson et al. | 375/111 |
| 4,914,618 | * 4/1990 | Dodge | 364/900 |
| 5,274,679 | * 12/1993 | Abe et al. | 375/117 |
| 5,953,489 | * 9/1999 | Park | 386/109 |

OTHER PUBLICATIONS

*Motorola Semiconductor Application Note*, by Scott George, CSIC MCU Product Engineering, 1995, pp. 1 through 22.
*Élan™SC400 and ElanSC410 Microcontrollers User's Manual*, Advanced Micro Devices, 1997, pp. i and ii, 15–1 through 15–8.
*The 8051 Microcontroller*, Vault Information Services, Jun. 17, 1997, pp. 1 through 7.
*Back to Basics: Serial I/O Port for the 8XC196KC/KD*, Intel Corporation, Jun. 18, 1997, pp. 1 through 6.

* cited by examiner

Primary Examiner—Stephen Chin
Assistant Examiner—Dac V. Ha
(74) Attorney, Agent, or Firm—Akin, Gump, Strauss, Hauer & Feld, L.L.P.

(57) ABSTRACT

A microcontroller provides an asynchronous serial port with a serial clock derived from the processor clock. Although the serial clock cannot be exactly programmed to yield an ideal frame length at a particular baud rate, an additional register is provided for tuning the frame length. Each transmitted asynchronous serial frame is stretched by a number of either serial clock phases or processor clocks defined in the tuning register. This provides for improved reception of the asynchronous data, because the frame length more nearly matches the ideal baud rate frame length.

31 Claims, 7 Drawing Sheets

BAUD RATE GRANULARITY IN SINGLE CLOCK MICROCONTROLLERS FOR SERIAL PORT TRANSMISSIONS

BACKGROUND OF THE INVENTION

1. Field of the Invention

The apparatus and method according to the invention pertains to microcontrollers, and more specifically, to a microcontroller providing more accurate asynchronous serial port transmit baud rates.

2. Description of the Related Art

Although consumers readily recognize the impact of personal computers in our society, they may be less aware of other manifestations of microcomputers within everyday life. Industrial and consumer products often require dedicated intelligence of their own, and to this end, the same technology that powers a personal computer has found its way into everyday industrial and consumer goods, such as cellular phones, televisions, stereo systems, and a wide variety of other products. Similarly, scientific instrumentation, communications systems, and control systems invariably include microcontrollers.

A centerpiece of this technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size and cost are reduced, often important in consumer products.

From a consumer products designer's viewpoint, often the particular combination of added features make a particular microcontroller attractive for a given application. Many microcontrollers are available that use the standard 80×86 microprocessor instructions, allowing for software to be easily developed for such microcontrollers. Because of the similar execution unit instruction sets, the added features often become principal differentiating criteria between particular microcontrollers.

An asynchronous serial communications port is one such common additional feature in a microcontroller. An asynchronous serial link allows the microcontroller to communicate with other devices or over data lines by sequentially sending and receiving bits of data. The "asynchronous" nature indicates these ports do not provide a separate clock signal to clock the data. Instead, the rate at which data is sent and received must be predetermined or prenegotiated, and independently controlled on both the sending and receiving ends. This data rate is known as the baud rate, which is the inverse of one bit period. The baud rate is generally one of a number of predefined rates, which are standard within the industry. Such rates include 1200, 2400, 4800, 9600, 19.2K, 28.8K, 33.3K, and 54K baud and high data transfer rates.

In an asynchronous serial communications link, data is typically digitally transmitted by first sending a start bit, which begins with a falling data signal and lasts for the bit period at the transmit baud rate. The start bit is then followed by data bits, typically 7, 8, or 9, again each data bit lasting for one bit period. After an optional parity bit, a stop bit is sent by driving the data line high for one, one and one half, or two bit periods. The next data item then follows beginning with another start bit or the data line remains high for an indeterminate amount of time indicating no data. A typical data format is one start bit, 8 data bits, no parity bit, and one stop bit, which is commonly referred to as N-8-1 format (no parity, eight data, one stop bit). The transmission of an entire data item—start bit, data and parity, then stop bit—is commonly referred to as one frame.

Although some variation from the ideal baud rate may be permissible, it is generally desirable to transmit as close to the ideal baud rate as possible. For example, at 33.3K baud, one bit period should equal 30 microseconds. Over 10 bit periods, which form a frame in N-8-1 format, the bit period clock, or the length of time per bit, can differ between transmitter and receiver by at most ½ of a bit period, which is a 5% clock variation for ten bits. If this theoretical limit is exceeded, data will be lost. This is because after the falling edge of the start bit, the receiver samples each received data bit around the center of its bit period. But after 10 bit periods, should the transmit and receive clocks differ by over 5%, the receiver will sample the stop bit outside of the transmitted bit period for that stop bit. This is further explained below with respect to FIG. 4.

Further, when a continuous stream of data is being asynchronously received, the receiver does not necessarily restart its internal state machine based on each new start bit. After a stop bit is sampled at the appropriate point, some receivers wait until the stop bit should end before detecting whether another start bit has begun. If, at that point, the receiver detects that the start bit for a new frame has begun, the receiver samples the start bit one-half bit period later (to ensure it is not a spurious line drop), and then samples the frame's data, parity, and stop bits at appropriate points. This, however, can cause a cumulative error in which the center sample points gradually shift over a sequence of frames. This situation is generally inconsequential in discretely implemented asynchronous serial communications devices, because such devices typically have their own clocks and crystals, and thus can be accurately set to transmit and receive at particular baud rates. But when an asynchronous serial port is implemented as part of a microcontroller, it is preferable to use the microcontroller processor clock to create the asynchronous serial clock rather than provide a separate clock and crystal strictly for the serial port. Such a crystal would require the use of additional pins and additional components. Therefore, such asynchronous serial port clocks are typically implemented by dividing the processor clock by a certain factor, and then using that divided processor clock as the serial clock. The serial clock is selected such that each bit period of the asynchronous serial port, at the selected baud rate, contains a predetermined number of phases of the serial clock, such as 16 or 32. This permits the receiver to determine appropriate center points for sampling, to accurately synchronize with the start bit, and to sample the more than one point in a bit period for noise reduction purposes.

A problem with using the processor clock to generate the serial clock, however, is that often it is impossible to divide the processor clock by an integer yielding an exactly appropriate serial clock. Instead, the actual bit period resulting from the derived serial clock will be off by some percentage from the ideal baud rate. This is acceptable when communicating with other systems similarly implemented, and is also acceptable when communicating with a system which itself runs at the ideal baud rate. But assume, for example, that a system is implemented in which the serial clock is 3% too fast. Such a system will have communications errors when attempting to communicate with a system whose serial clock is 3% too slow because multiple cumulative errors could exceed a ½-bit period in a 10-bit frame.

It would be desirable to implement an asynchronous serial port which operates more closely to the ideal baud rate even in a system in which the processor clock is divided to provide the serial clock.

SUMMARY OF THE INVENTION

According to the invention, an asynchronous serial port is implemented on a microcontroller using a divided processor clock as the serial clock. Even if the microcontroller clock cannot be integrally divided to yield a serial clock that will produce the exact bit period for the selected baud rate, this is compensated for by stretching the stop bit by an amount appropriate to yield close to the ideal frame length.

First, when the processor clock rate is divided to yield the serial clock, but it is impossible to achieve the exact bit period, the processor clock divisor is selected to yield a frame length that is shorter than the ideal frame length. Then, for a chosen transmission protocol, such as N-8-1, the number of additional serial clock phases necessary to more closely match the desired frame length is chosen. Using N-8-1 protocol, for example, the 10 transmitted bits that form the frame should take a certain period of time for transmission. It is first determined how long those bits will take to transmit given the chosen processor divisor, and then an additional number of serial clock phases are selected such that, if added to the total frame time, they would more closely yield the ideal frame length. These additional clock phases are preferably set through a register. If an exact ideal frame length cannot be achieved, preferably a slightly longer frame length is selected.

At the end of the stop bit, the specified number of serial clock phases are added to the stop bit. Thus, the actual length of time for a frame will differ from the ideal length of time for a frame by no more than one serial clock phase. This is in order of magnitude improvement over the accuracy achievable by simply selecting the number of processor clocks within a serial clock phase.

Even though the serial data transfer occurs slightly more quickly than is ideal, the stop bit circuitry holds the stop bit high for the specified additional amount of "tuning" time, yielding a total frame transfer time much closer to the ideal baud rate. The next start bit is then provided low and the next data item provided. But the total amount of time necessary to transmit a start bit, the data bits, and the stop bit is very close to ideal.

For even added precision, rather than adding a specified number of serial clock phases to the end of the stop bit, a specified number of processor clocks can instead be added to the stop bit. This provides even further resolution to closer match the ideal frame length.

Additionally, feeback logic can be implemented to dynamically adjust the number of additional clock phases added to the end of a frame. This feedback logic, responsive to frame errors or lack of frame errors, could lengthen and shorten the additional "tuning" time by adjusting the value of a baud rate tuning register. In this way, this system is self-optimizing.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
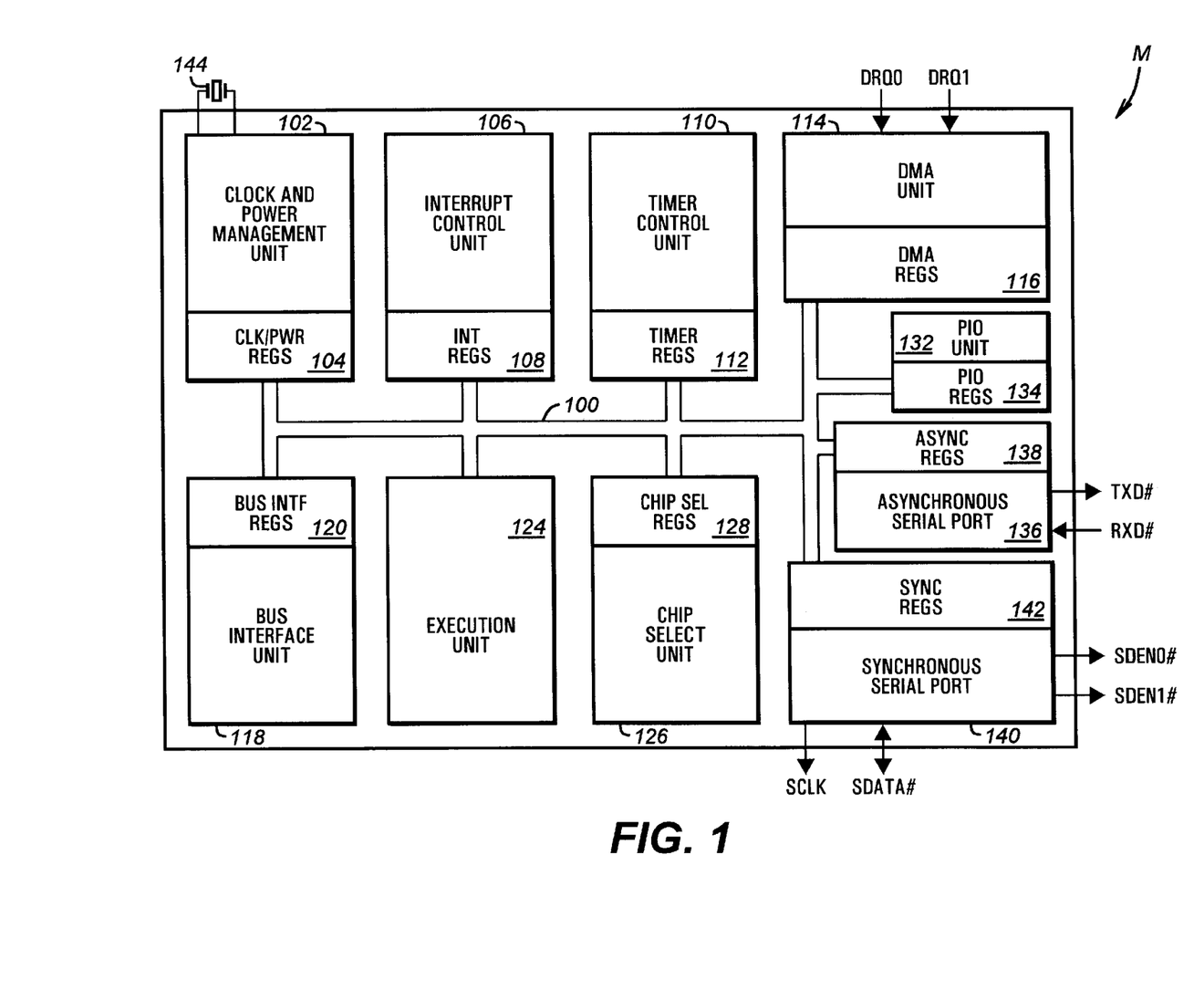
FIG. 1 is a block diagram of a typical microcontroller in which the techniques according to the invention can be implemented.

Turning to FIG. 1, shown is a block diagram of a typical microcontroller M implemented according to the invention. Such a microcontroller is preferably implemented on a single monolithic integrated circuit. The microcontroller M preferably includes an internal bus 100 coupling a variety of functional units and registers used to control and monitor those units. These include a clock and power management unit 102 with corresponding clock/power registers 104, an interrupt control unit 106 with corresponding interrupt registers 108, a timer control unit 110 with corresponding timer registers 112, a direct memory access (DMA) unit 114 with corresponding DMA registers 116, a bus interface unit 118 with corresponding bus interface registers 120, an execution unit 124 which is essentially a microprocessor core, a chip select unit 126 with corresponding chip select registers 128, a programmable input/output (PIO) unit 132 with corresponding PIO registers 134, an asynchronous serial port 136 with corresponding asynchronous register 138, and a synchronous serial port 140 with corresponding synchronous registers 142. Further, note the clock and power management unit 102 includes external pads connected to a crystal 144, which provides the timing not only for the execution unit 124, but also for generating the serial clock in the asynchronous serial port 136.

The block diagram of the microcontroller M is typical of microcontrollers, and could be for example, the Am186EM microcontroller by Advanced Micro Devices, Inc., of Sunnyvale, Calif. The techniques and circuitry according to the invention, however, could be applied to a wide variety of microcontrollers as well as other devices that use a non-ideal clock for generation of asynchronous serial port clocks.

Further, the term "microcontroller" has differing definitions in industry. Some companies refer to a processor core with additional features (such as I/O) as a "microprocessor" if it has no onboard memory, and digital signal processors (DSPs) are now used for both special and general purpose controller functions. So as here used, the term "microcontroller" covers all of the products, and generally means an execution unit with added functionality all implemented on a single monolithic integrated circuit.

According to the invention, the logic implementing the asynchronous serial port 136 and the corresponding asynchronous registers 138 is modified to provide added granularity in selecting the baud rate. The asynchronous serial port 136 communicates over external pads which provide a transmit data signal TXD# and a receive data signal RXD#.

Throughout the disclosure, when a physical signal is defined to be negative logic, or active low, it is followed by a pound sign "#". For convenience in discussing logic, a corresponding positive logical counterpart is often used. For example, the transmit data signal TXD# over the external pad corresponds to an internal logical signal TXD, which is at a high level when the TXD# is at a low level.

Figure 2:
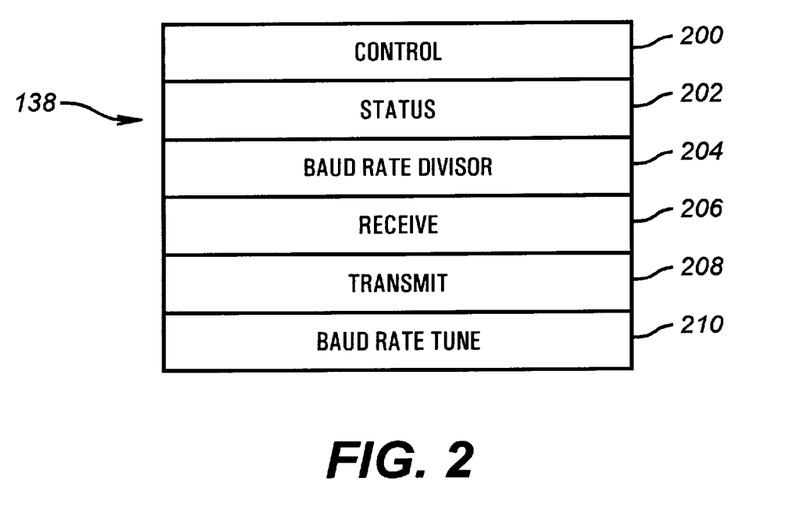
FIG. 2 is a block diagram illustrating asynchronous serial port registers implemented in a microcontroller according to the invention.

Turning to FIG. 2, illustrated are typical registers employed as the asynchronous registers 138 for the asynchronous serial port 136. Shown are a control register 200, a status register 202, a baud rate divisor register 204, a receive register 206, and a transmit register 208. These registers provide transmit data buffers, receive data buffers, control bits, and status bits for the asynchronous serial port 136 or ports within the microcontroller M employing commonly used techniques. Each of the registers is preferably implemented as a 16-bit memory-mapped register, although they could instead be 8 bit or another width and could be I/O mapped.

In a typical microcontroller M, the control register 200 includes bits for DMA control, for receive status interrupt enable, for sending a break, for transmitting a 9th data bit, for enabling flow control, for providing a transmitter ready interrupt enable, for providing a receive data ready interrupt enable, for setting the transmit mode, for setting the receive mode, for setting parity and enabling parity, and for setting a mode of operation. The status register 202 preferably includes long and short break detect bits, a received 9th data bit, a receive data ready bit, a transmit holding register empty bit, a framing error detect bit, an overrun error detect bit, a parity error detect bit, transmitter empty bit, and a handshaking signal coupled to an external clear-to-send pin.

The receive register 204 is preferably a double-buffered receive register holding eight data bits. Similarly, the transmit register 208 is preferably a double-buffered (or multi-buffered) transmit register from which data is copied to a shift register for sending over the serial link. All of these various registers and their meanings are typical of microcontrollers, and are further described, for example, in the Am186ES Microcontroller User's Manual.

Use of the Processor Clock to Generate a Serial Clock

The baud rate divisor register is used to derive the serial clock from the processor clock. This serial clock runs at some multiple of the frequency corresponding to the baud rate, with typically either 16 or 32 serial clock phases within a single bit period for a corresponding baud rate. In the exemplary embodiment, there are 16 serial clock phases per bit period. The following table gives illustrative baud rate divisors based on particular processor clock rates to yield a particular baud rate:

| Baud Rate | Divisor Based on CPU Clock Rate | | | |
|---|---|---|---|---|
| | 20 MHz | 25 MHz | 33 MHz | 40 MHz |
| 300 | 4166 | 5208 | 6875 | 8333 |
| 600 | 2083 | 2604 | 3437 | 4166 |
| 1050 | 1190 | 1488 | 1964 | 2380 |
| 1200 | 1041 | 1302 | 1718 | 2083 |
| 1800 | 694 | 868 | 1145 | 1388 |
| 2400 | 520 | 651 | 859 | 1041 |
| 4800 | 260 | 325 | 429 | 520 |
| 7200 | 173 | 217 | 286 | 347 |
| 9600 | 130 | 162 | 214 | 260 |
| 19200 | 65 | 81 | 107 | 130 |
| 28800 | 43 | 54 | 71 | 86 |
| 38400 | 33 | 40 | 53 | 65 |
| 56000 | 22 | 28 | 36 | 45 |
| 57600 | 22 | 27 | 35 | 43 |
| 76800 | 16 | 20 | 26 | 32 |
| 115200 | 10 | 13 | 18 | 22 |
| 128000 | 9 | 12 | 16 | 19 |
| 153600 | 8 | 10 | 13 | 16 |

It should be noted that the resolution with which one can "tune" the bit period can in some cases have a particularly large degree of error. Using a 40 MHz clock for a 19.2K baud serial link, the use of a baud rate divisor of 130 yields a relatively small error of 0.16%. But, for example, employing a 20 MHz clock in attempting to develop a baud rate of 115.2K baud, the divisor of 10 yields an error of 7.84%. This error is in part because the divisor only specifies the number of internal processor cycles in one phase of the 16× serial clock. Therefore, adjusting the divisor by one results in the bit period being either 16 processor clocks longer or shorter than the previous rate. This is further compounded over the transmission of a data frame, where this error is accumulated over ten bit periods when transmitting in N-8-1 protocol.

According to the invention, this error is reduced by providing a baud rate tune register 210. This register specifies a number of serial clock phases (or alternatively, a number of processor clocks) to add to the end of a transmitted data frame before beginning the next start bit. By appropriate adjustment of the baud rate tune register 210, the actual transmitted frame length can be adjusted to within one serial clock (or one processor clock) of the ideal frame length.

Figure 3:
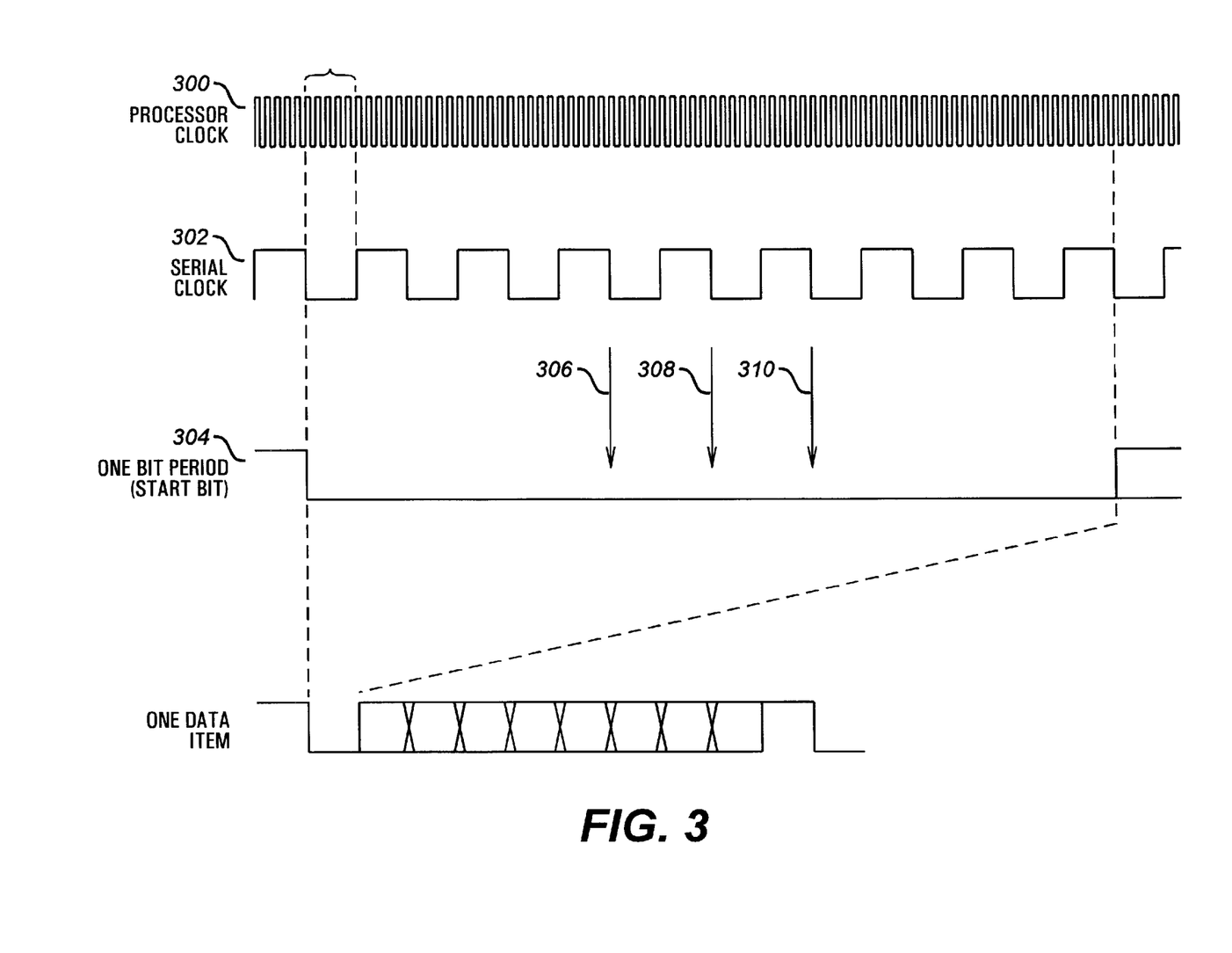
FIG. 3 is a timing diagram illustrating the clocking relationship within a typical microcontroller implemented asynchronous serial port.

The relationship between the various clocks is further illustrated in the timing diagram of FIG. 3. In this diagram, a processor clock signal 300 is shown, in which five cycles of the processor clock correspond to one phase of a serial clock signal 302. In turn, 16 phases of the serial clock generate one bit period of an asynchronous serial signal 304.

Referring to the serial clock signal 302 and the asynchronous serial signal 304, it can be better understood why a serial clock which is some multiple of the baud rate is desirable. When receiving asynchronous serial data, the receiver preferably monitors for a start bit, which would be a low signal after a high signal has been present on the asynchronous data line. Then, the serial clock is used to determine a mid-point within the start bit to check to ensure that a start bit is in progress, rather than simply a spurious data drop. This sampling should be at the mid-point of the bit period. Further, however, many asynchronous receivers employ an averaging technique in which more than one point in each received bit period is monitored. In FIG. 3, these points are shown as three sampling points 306, 308, and 310 near the center of the bit period of the asynchronous serial signal 304. These multiple sample points are used to reduce the effects of random noise on the data signal.

Therefore, a higher speed serial clock signal 302 provides appropriate signal edges at which to employ this monitoring. Although multiple sample points for a period are typically used in an asynchronous serial receiver, these will be reduced to a single sample point in the remainder of the discussion for simplicity.

Problems With an Inaccurate Serial Clock

Figure 4:
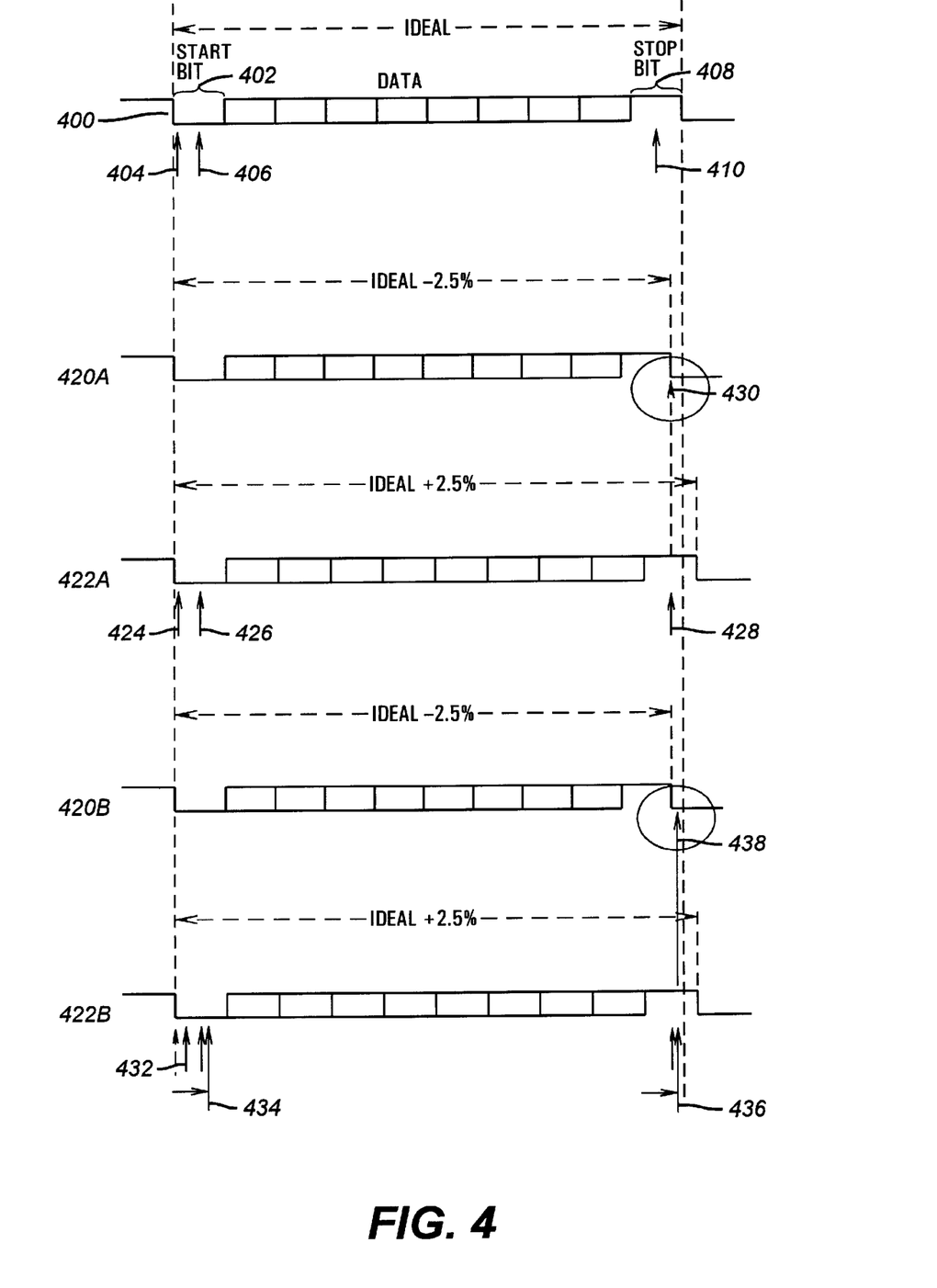
FIG. 4 is a timing diagram illustrating problems associated with asynchronous serial transmission and reception using other than an ideal clocking rate.

Turning to FIG. 4, signals are shown illustrating the deleterious effects of an asynchronous transmitter transmitting at other than the ideal frequency, and an asynchronous receiver with a serial receive clock running at other than the ideal frequency for a particular baud rate. Shown is a first, ideal transmitted signal 400 which is preferably transmitted at a particular ideal baud rate. The receiver, also running with a serial clock suitable for the ideal baud rate, synchronizes with a start bit 402 at its falling edge 404, and then samples the start bit 402 at a sample point 406, which falls in the center of the start bit 402. At the end of the frame, the receiver similarly samples a stop bit 408 at a sample point 410, which again falls within the center of the stop bit 408.

Assume, however, that the transmitter instead transmits its asynchronous signal 2.5% faster than the ideal baud rate, such that an entire transmit period is the ideal frame less 2.5%. This is illustrated by the signal 420A. Further, assume that the receiver has a serial clock running 2.5% slower than the ideal baud rate. Thus, the receiver expects a signal with a timing similar to that of the signal 422A. In this case, the receiver synchronizes with the start bit at a point 424, samples the start bit at a point 426, and then samples the stop bit at a point 428. As can be seen, however, the receiver then samples the received (as opposed to ideal) stop bit at a point 430, at the very end of the stop bit of the transmitted signal 420A. Given one start bit, one stop bit, and eight data bits with no parity, a 5% deviation between the transmit and receive clock rates is thus the absolute theoretical maximum rate at which data can be transmitted and received.

But when data is being continuously transmitted such that a stop bit is immediately followed by another start bit, receivers do not necessarily automatically resynchronize with the start bit. Instead, they wait an appropriate period for the next start bit to have started, ensure that it has in fact started, and then sample in the middle of that subsequent start bit. (See the state machine and discussion of FIG. 6.) Over time, this can cause the sample points 424, 426, and 428 to shift. Referring to the signals 420B and 422B, which are the same timing as the signals 420A and 422A, it is seen that as the sample points 424 and 426 have shifted to new sample points 432 and 434, the corresponding stop bit sample point 428 has shifted to a new sample point 436. The stop bit in the actual received signal 420B has then ended by the time the receiver samples point 436, and thus the received signal 420B is thus sampled at point 438 during the next start bit. This causes a frame error.

This situation can be rectified by adding stop bits to the transmitted data. In standard asynchronous communication, the stop bit can be specified to be 1, 1½, or 2 bit periods long. By selecting one and one-half or two bit periods for the stop bit, the receiver is forced to resynchronize with the following start bit. This, however, unnecessarily reduces data throughput, because nearly one-half to one extra bit period is being added to each frame without any increase in data being transmitted.

Baud Rate Tuning

Figure 5:
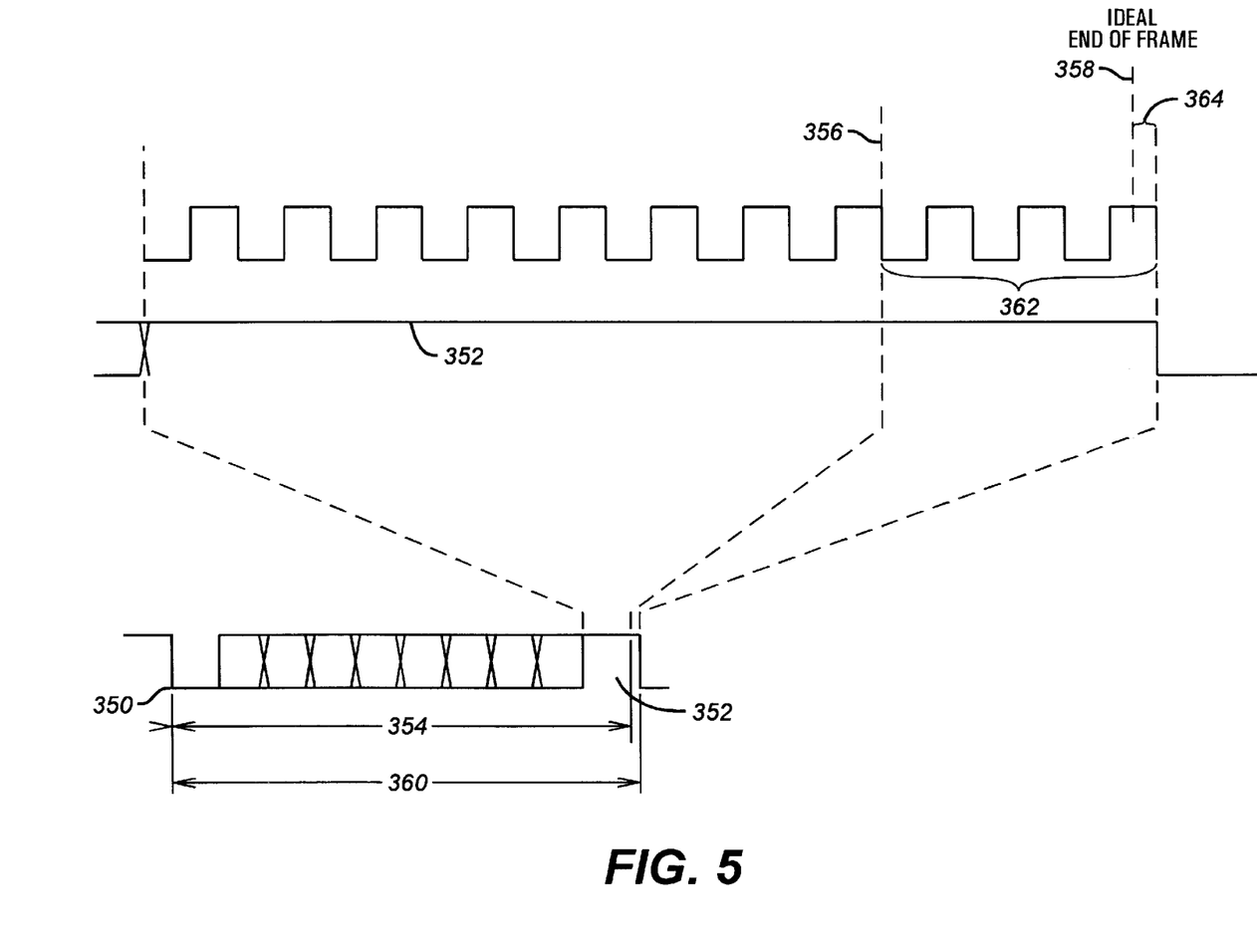
FIG. 5 is a timing diagram illustrating baud rate tuning according to the invention.

Turning to FIG. 5, illustrated is the addition of serial clock phases to the stop bit according to the invention. One data frame 350 is represented, here one start bit, eight data bits, and one stop bit 352. The baud rate divisor register 204 has been selected such that if the baud rate tune register 210 were zero, a frame period 354 would be realized. This is the frame length resulting from the baud rate divisor register 204 being selected such that it will yield an end of frame 356 as close to an ideal end of frame 358 as possible. But as seen in FIG. 5, this is less than an ideal frame length 360. So according to the invention, the baud rate tune register 210 (in the particular case illustrated in FIG. 5) is set to 6. This causes six additional serial clock phases 362 to be appended to the end of the stop bit, yielding a complete stop bit 352. Thus, the actual frame length exceeds the ideal frame length 360 by, in this case, one-half of a serial clock 364. It will be appreciated that according to the invention, the actual frame length could be adjusted to within one serial clock phase of the ideal frame length. Further, if the six serial clocks 362 are replaced by processor clocks, it will be appreciated that the resolution of selecting an ideal frame length is increased even more so, five fold if the baud rate divisor 204 is set to 5 as illustrated in FIG. 3.

By selecting the baud rate tune register 210 to cause the actual ideal end of frame 358 to be slightly exceeded, this will force a resynchronization by a receiver, and thus is the preferable setting for the baud rate tune register 210.

Figure 6:
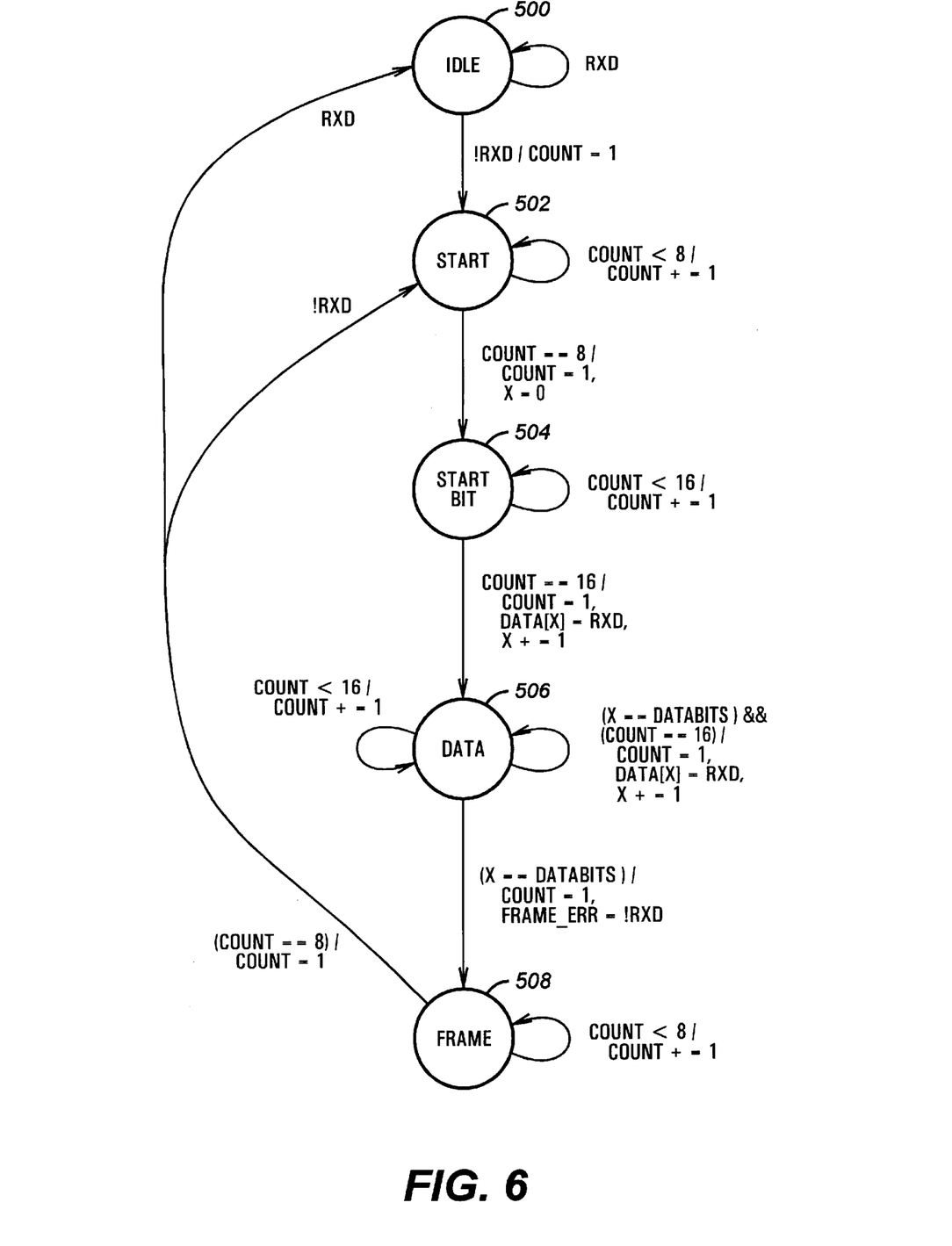
FIG. 6 is a state diagram illustrating a typical asynchronous receiver for use with a transmitter according to the invention.

Turning to FIG. 6, shown is a simplified state diagram for receive logic in the asynchronous serial port 136 with which the transmit logic according to the invention would be particularly useful. This state diagram is simplified in the sense that it does not include a number of implementation details that one skilled in the art of constructing asynchronous send and receive circuits would readily appreciate, such as parity, statistical sampling to reduce noise, etc. This state diagram would typically be implemented using integrated circuit design code, which would be compiled and incorporated as part of the microcontroller M of FIG. 1.

The state diagram of FIG. 6 is preferably clocked by the serial clock signal 302 illustrated in FIG. 3 and preferably transitions on each rising and falling edge of the serial clock. For each state transition, first the transition conditions are illustrated. These transition conditions, when true, cause the state machine of FIG. 6 to transition on a rising or falling edge of the serial clock signal 302 to the next indicated state. After the transition conditions (following the "/" character), particular variable assignments and modifications for that transition are shown.

Beginning in an idle state 500, when the receive data signal RXD is high, this indicates that a start bit has not yet been transmitted, so the state machine stays in the idle state 350. Of note, only positive logic is shown in the state diagram of FIG. 6. While the actual physical signals for transmit and receive data in FIG. 1 are the active low signals TXD# and RXD#, the corresponding positive logic signals TXD and RXD are used in the state diagrams of FIGS. 6 and 7.

When the receive data signal RXD becomes low indicating a start bit has begun, the state machine transitions from the idle state 500 to a start state 502. In doing so, a count variable COUNT is set to 1. This count variable is used throughout the state diagram for counting the number of serial clock phases that have passed, so that the state machine can transition between its various start, data, and frame states at the appropriate times.

The state machine remains in the start state 502 for eight phases of the serial clock. This is because the count variable is compared to 8, and if less than 8, is incremented when the state machine returns to the start state 502. After eight phases of the serial clock, the count variable equals 8, so the state machine transitions from the start state 502 to a start bit state 504. Referring to FIG. 3, it will be appreciated that at this point the state machine of FIG. 6 should be in the middle of the received start bit, given that eight phases of the serial clock have passed, and sixteen phases of the serial clock equal one bit period. So, upon entry into the start bit state 504, an actual implemented state machine would most likely include logic to ensure that the start bit was in fact occurring (i.e., RXD was still low), and if not, transition back to the idle state 500 or to some error state. The simplified state machine diagram of FIG. 6 has omitted this step for clarity. These additional features will be appreciated by those skilled in communication circuitry design.

Upon entry into the start bit state 504, the count variable is reset to 1, and a variable X is set to 0. The variable X is used to count data bits within the data item being transmitted in the present asynchronous serial frame. In any case, the state machine remains in the start bit state 504 for sixteen serial clock phases, at which point it transitions to a data state 506. The state machine should be in the middle of the first received data bit of the data item, so upon entry into the data state 356, a first data item DATA[0] is set equal to the value of the receive data signal RXD, and X is incremented in preparation for storage of the next data item. (In actuality, a shift register would typically be used.) Further, the count variable is reset to 1.

The state machine remains in the data state 506 for sixteen more serial clock phases and the count variable is incremented at the end of each phase. After sixteen serial clock phases, the state machine is now ready to sample the next data item, so, because the count variable is equal to sixteen and X is less than the number of data bits (such as 8), the count is reset to 1, the next data item is stored by loading the receive data signal RXD into the next data item DATA[X], and X is incremented, at this point to 2. The data state is again reentered, and sixteen more serial clock phases are counted. This continues until X equals the number of data bits (such as 8).

At this point, the transmit frame should be in the middle of the stop bit, so the state machine transitions from the data state 506 to a frame state 358. On entering that frame state 508, the count variable is reset to 1, and a frame error bit FRAME_ERR is loaded with the inverse of the value of the received data signal RXD. A frame error occurs if the received data signal RXD is not high at this particular point, because the state machine should be in the middle of the stop bit of the receive frame. The state machine stays in the frame state 508 for eight more serial clock phases. At this point, the data item should be just ending, so the state machine then transitions from the frame state 502 to the start state 502 if the receive data signal is low, (indicating the next start bit has begun) or instead transitions to the idle state 500 if the receive data signal RXD is high (indicating the next frame has not begun).

A consequence of the state machine of FIG. 6 is that if an asynchronous transmitter continuously transmits data with one stop bit and no pause between stop bit and start bit, and the transmitter is transmitting with a bit period that is somewhat shorter than an ideal bit period, over time the stop bit sample point will shift as illustrated by the sample point 436 of FIG. 4. Specifically, over subsequent bits, the transitions from the frame state 508 to the start state 502 will occur later and later within the start bit. This will correspondingly cause the subsequent sampling of the stop bit to occur later and later within the stop bit state. But further, because the receiver is running at a slightly longer bit period than the transmitter, ultimately, the stop bit sampling 436 of FIG. 4 will occur after the end of the transmitted stop bit, and as illustrated by the sample point 438, the start bit will actually be sampled. Thus, a frame error will occur.

Figure 7:
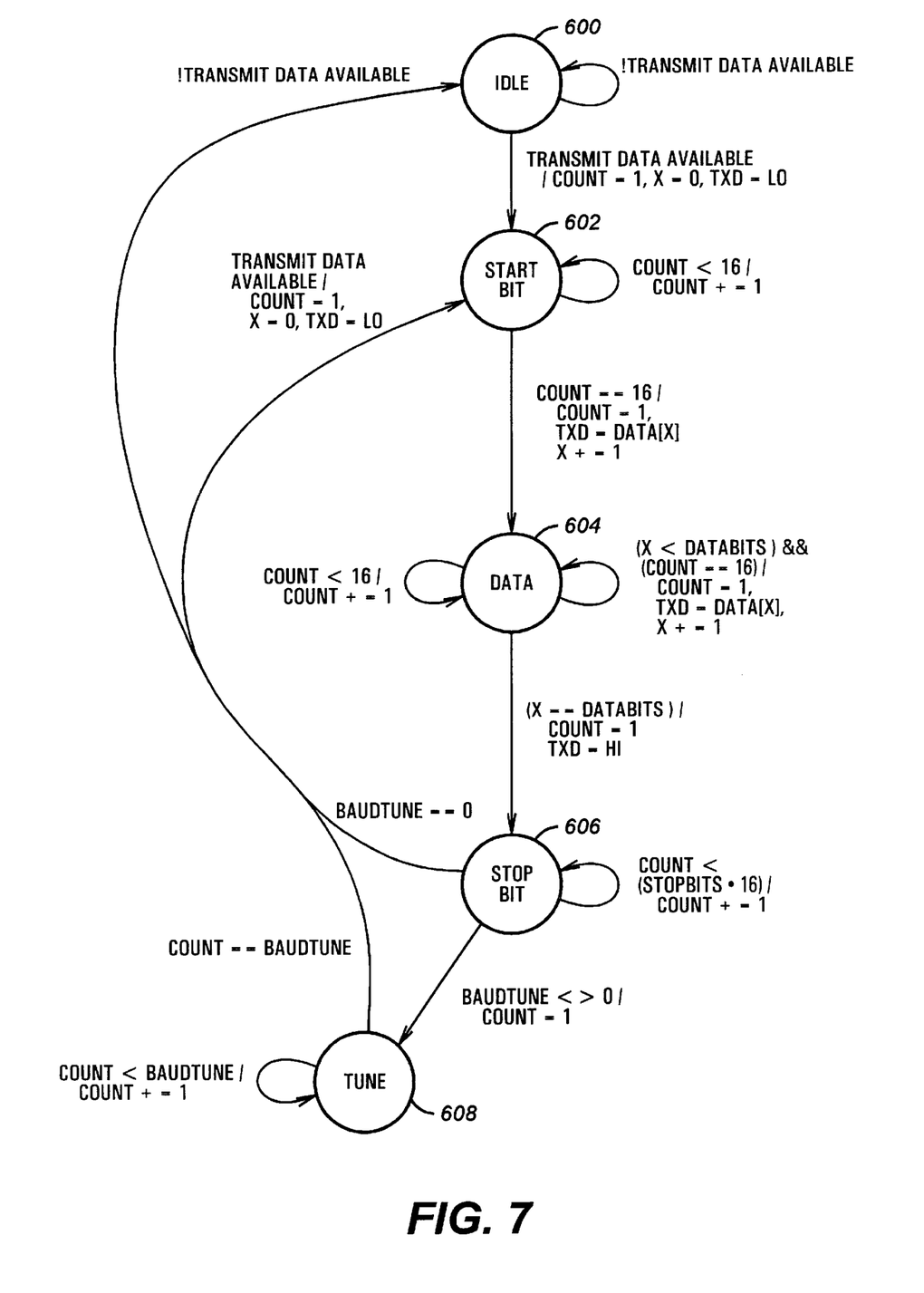
FIG. 7 is a state diagram illustrating an asynchronous transmitter implemented according to the invention.

To reduce this possibility, the asynchronous serial port 136 according to the invention implements a state machine for transmitting as illustrated in FIG. 7. To summarize, the state machine begins in an idle state 600, and remains there until transmit data is available. It then transitions to a start bit state 602, where it remains for one bit period, and then transitions to a data state 604, where it remains for eight bit periods (if 8 data bits are being used). The state machine then transitions to a stop bit state 606, where it remains for either one, one and a half, or two bit periods.

At this point in a prior asynchronous serial port 136 transmitter, the state machine would transition from the stop bit state 606 to either the idle state 600 (if additional transmit data was not available) or to the start bit state 602. According to the invention, however, if the baud rate tune register 210 is not equal to zero, the stop bit state 606 instead transitions to a tune state 608. The state machine remains in this tune state 608 for a number of serial clock phases equal to the value in the baud rate tune register 210. Only then does the state machine transition either to the idle state 600 or the start bit state 602, dependent on whether transmit data is available.

Alternatively, the state machine of FIG. 7 can be clocked by the serial clock signal 302 except for the tune state 608. If finer resolution of baud rate tuning is desired, the state machine can remain in the tune state 608 for a certain number of processor clocks or processor clock phases. Referring to FIG. 3, it is seen that if a baud rate divisor 204 of five is used, the use of the processor clock signal 300 to clock out of the tune state 608 rather than the serial clock signal 302 will improve the resolution of baud rate tuning five-fold. To do so, however, the serial clock signal 302 would have to be resynchronized upon exit from the tune state 608.

Turning to details of the state machine of FIG. 7, the count variable and X serve the same general purpose as that of the state machine of FIG. 6. Instead of data being received, however, a start bit is first sent by driving a transmit data signal TXD low while within the start bit state 602, where the state machine remains for sixteen serial clock phases. The state machine then transitions to a data state 604, where the transmit data signal TXD is driven to the first data bit's value for sixteen serial clocks. The count variable is reset to 1, the transmit data signal TXD is set to the next data item value, and X is incremented. This is repeated for the appropriate number of data bits. The state machine then transitions from the data state 604 to the stop bit state 606, driving the transmit data signal TXD high in the process. The transmit data signal TXD remains high for the appropriate number of serial clock phases dependent on the number of stop bits that have been selected. Then, as discussed above, the state machine transitions either from the stop state 606 to the tune state 608, or, if the baud rate tune register 210 is zero, directly to the idle state 600 or the start bit state 602.

The state machines of FIGS. 6 and 7 can be implemented using a variety of techniques. They could be implemented, for example, by employing integrated circuit programming languages, such as Verilog, or could be microcoded as part of an I/O processor that is part of a microcontroller M. Further, the states shown in FIGS. 6 and 7 are illustrative only, as a typical state machine for the asynchronous serial port 136 would include parity bits and additional states for error handling, and might divide one of those states illustrated into multiple states. Also, although the stop bit state 606 is shown independent from the tune state 608, the stop bit state 606 logic could instead have the tune state 608 logic incorporated into it, such as by making the state transition condition from the stop bit state 606 to the idle state 600 or the start bit state 600 dependent on count being less than a number of stop bits times sixteen, plus the value in the baud rate tune register 210. The state machines of FIGS. 6 and 7 also do not necessarily need to be implemented as state machines, but could be expanded out using other logic.

Further, microcontroller implemented asynchronous transmitters and receivers from various vendors may "err" on the side of being more adaptable to receiving serial data that is clocked either faster or slower than the ideal baud rate. That is, vendors may configure, or recommend configuration of, their asynchronous serial ports such that the internal clock rate better handles one or the other. If it is known whether the receiver is more tolerant of a faster or slower clock, an asynchronous transmitter according to the invention can be "tuned" to provide a "non-ideal" baud rate, but a baud rate that is more compatible with the receiver.

Feedback Control of Tuning Register

Figure 8:
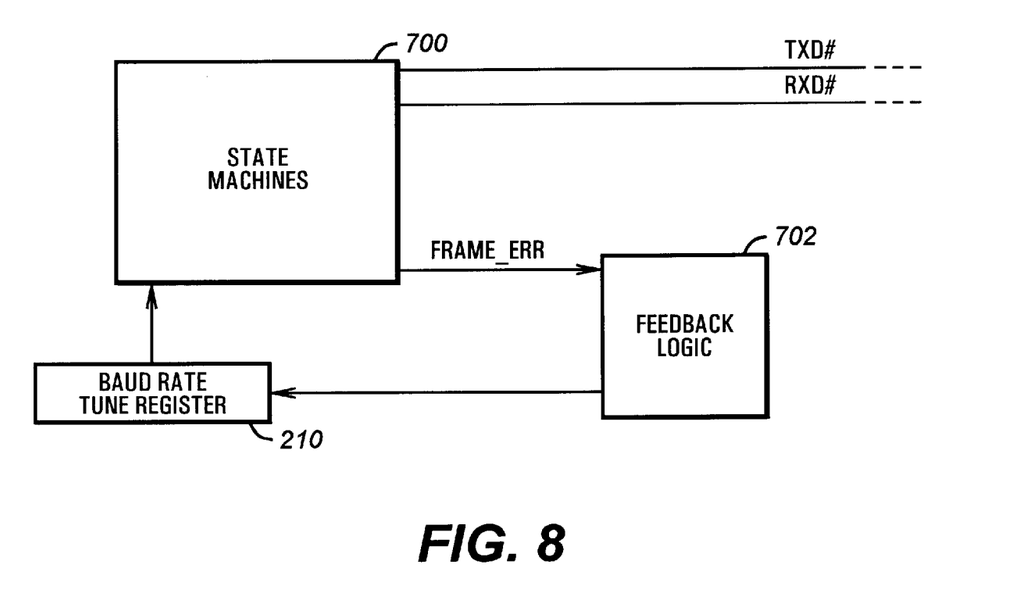
FIG. 8 is a block diagram illustrating the addition of feeback logic to an asynchronous serial port implemented according to the invention.

Turning to FIG. 8, illustrated is an additional feedback configuration that can be used to dynamically adjust the baud rate tune register 210. Specifically, the state machines of FIGS. 6 and 7 are shown as a state machines block 700, which are coupled to the transmit data line TXD# and the received data line RXD#. Further, the frame error signal FRAME_ERR, for example, is provided to feeback logic 702. This logic monitors for cyclically occurring frame errors that would indicate that the baud rate tune register 210 is set to too low of a value, and should instead be set to further stretch the clock signal. The feeback logic 702 would preferably increment the baud rate tune register 210 after detecting a periodic series of frame errors via the frame error signal FRAME_ERR. The feeback logic 702 could be more sophisticated, monitoring a variety of other signals from the state machines 700, but this particular configuration can be used to simply and dynamically adjust the baud rate tune register 210. As an alternative, for example, if the feedback logic forced the tune register 210 to zero, a stop bit could be automatically removed and the tune register 210 reloaded with a sufficient number of pulses to make up for the stop bit.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An asynchronous serial transmitter, comprising:
   start bit logic for providing a start bit of a predetermined bit period;
   data bit logic for providing data bits of the predetermined bit period;
   stop bit logic for providing a stop bit of a predetermined bit period;
   tuning logic for stretching the stop bit by a period less than one-half of the predetermined bit period; and
   feedback logic that adjusts the length of time the tuning logic stretches the stop bit responsive to errors from asynchronous serial receive logic.

2. The asynchronous serial transmitter of claim 1, further comprising:
   a programmable baud tune register that holds a tuning value adjusted by the feedback logic, the tuning value adjusting the length of time for the tuning logic to stretch the stop bit.

3. The asynchronous serial transmitter of claim 1, further comprising:
   a processor clock; and
   a serial clock derived by dividing the processor clock by a divisor, wherein the predetermined bit period is a first predetermined number of phases of the serial clock in length, and wherein the serial clock clocks the start bit logic, data bit logic, and stop bit logic.

4. The asynchronous serial transmitter of claim 3, further comprising:
   a programmable divisor register for holding the divisor.

5. The asynchronous serial transmitter of claim 3, wherein the bit period is 16 phases of the serial clock.

6. The asynchronous serial transmitter of claim 3, wherein the bit period is N phases of the serial clock, where N>1.

7. The asynchronous serial transmitter of claim 1, wherein the tuning logic is part of the stop bit logic.

8. The asynchronous serial transmitter of claim 7, further comprising:
   a processor clock; and
   a serial clock derived by dividing the processor clock by a divisor, wherein the predetermined bit period is a first predetermined number of phases of the serial clock in length, and wherein the serial clock clocks the start bit logic, data bit logic, and stop bit logic.

9. An asynchronous serial transmitter, comprising:
   start bit logic for providing a start bit of a predetermined bit period;
   data bit logic for providing data bits of the predetermined bit period;
   stop bit logic for providing a stop bit of a predetermined bit period;
   tuning logic for stretching the stop bit by a period less than one-half of the predetermined bit period;
   a processor clock; and
   a serial clock derived by dividing the processor clock by a divisor,
   wherein the predetermined bit period is a first predetermined number of phases of the serial clock in length,
   wherein the serial clock clocks the start bit logic, data bit logic, and stop bit logic,
   wherein the serial clock clocks the tuning logic,
   wherein the tuning logic stretches the stop bit by a second predetermined number of phases of the serial clock, and
   wherein the second predetermined number of phases of the serial clock is less than one half of the first predetermined number of phases of the serial clock.

10. The asynchronous serial transmitter of claim 9, further comprising:
    a programmable baud tune register that holds the second predetermined number of phases of the serial clock by which the tuning logic stretches the stop bit.

11. An asynchronous serial transmitter, comprising:
    start bit logic for providing a start bit of a predetermined bit period;
    data bit logic for providing data bits of the predetermined bit period;
    stop bit logic for providing a stop bit of a predetermined bit period;
    tuning logic for stretching the stop bit by a period less than one-half of the predetermined bit period;

a processor clock; and a serial clock derived by dividing the processor clock by a divisor, wherein the predetermined bit period is a first predetermined number of phases of the serial clock in length, wherein the serial clock clocks the start bit logic, data bit logic, and stop bit logic;

wherein the processor clock clocks the tuning logic, wherein the tuning logic stretches the stop bit by a predetermined number of periods of the processor clock, and wherein the predetermined number of periods of the processor clock is less than one half of the first predetermined number of phases of the serial clock times the divisor.

12. The asynchronous serial transmitter of claim 11, further comprising:

a programmable baud tune register that holds the predetermined number of periods of the processor clock by which the tuning logic stretches the stop bit.

13. A microcontroller implemented as a single monolithic integrated circuit, comprising:

an execution unit; and an asynchronous serial port coupled to the execution unit, the asynchronous serial port comprising:

start bit logic for providing a start bit of a predetermined bit period;

data bit logic for providing data bits of the predetermined bit period;

stop bit logic for providing a stop bit of a predetermined bit period;

tuning logic for stretching the stop bit by a period less than one-half of the predetermined bit period;

a processor clock; and a serial clock derived by dividing the processor clock by a divisor, wherein the predetermined bit period is a first predetermined number of phases of the serial clock in length, wherein the serial clock clocks the start bit logic, data bit logic, and stop bit logic, wherein the serial clock clocks the tuning logic, wherein the tuning logic stretches the stop bit by a second predetermined number of phases of the serial clock, and wherein the second predetermined number of phases of the serial clock is less than one half of the first predetermined number of phases of the serial clock.

14. The microcontroller of claim 13, further comprising:

a programmable baud tune register that holds the second predetermined number of phases of the serial clock by which the tuning logic stretches the stop bit, wherein the baud tune register is programmable by the execution unit.

15. A microcontroller implemented as a single monolithic integrated circuit, comprising:

an execution unit; and an asynchronous serial port coupled to the execution unit, the asynchronous serial port comprising:

start bit logic for providing a start bit of a predetermined bit period;

data bit logic for providing data bits of the predetermined bit period;

stop bit logic for providing a stop bit of a predetermined bit period;

tuning logic for stretching the stop bit by a period less than one-half of the predetermined bit period;

a processor clock; and a serial clock derived by dividing the processor clock by a divisor, wherein the predetermined bit period is a first predetermined number of phases of the serial clock in length, wherein the serial clock clocks the start bit logic, data bit logic, and stop bit logic, wherein the processor clock clocks the tuning logic, wherein the tuning logic stretches the stop bit by a predetermined number of periods of the processor clock, and wherein the predetermined number of periods of the processor clock is less than one half of the first predetermined number of phases of the serial clock times the divisor.

16. The microcontroller of claim 15, further comprising:

a programmable baud tune register that holds the predetermined number of periods of the processor clock by which the tuning logic stretches the stop bit, wherein the baud tune register is programmable by the execution unit.

17. An asynchronous serial transmitter having a serial clock, comprising:

start bit logic for providing a start bit of a predetermined bit period;

data bit logic for providing data bits of the predetermined bit period;

stop bit logic for providing a stop bit of a predetermined bit period; and tuning logic for stretching the stop bit, wherein the tuning logic is clocked by a processor clock and the stop bit logic is clocked by a serial clock, and wherein the frequency of the processor clock is greater than the frequency of the serial clock.

18. The asynchronous serial transmitter of claim 17, further comprising:

a programmable baud tune register that holds a tuning value that determines the predetermined number of periods of the processor clock.

19. A microcontroller implemented as a single monolithic integrated circuit, comprising:

an execution unit; and an asynchronous serial port coupled to the execution unit, the asynchronous serial port comprising:

start bit logic for providing a start bit of a predetermined bit period;

data bit logic for providing data bits of the predetermined bit period;

stop bit logic for providing a stop bit of a predetermined bit period;

tuning logic for stretching the stop bit by a period less than one-half of the predetermined bit period; and feedback logic that adjusts the length of time the tuning logic stretches the stop bit responsive to errors from asynchronous serial receive logic.

20. The microcontroller of claim 19, further comprising:

a programmable baud tune register that holds a tuning value adjusted by the feedback logic, the tuning value adjusting the length of time for the tuning logic to stretch the stop bit, wherein the baud tune register is programmable by the execution unit.

21. The microcontroller of claim 19, further comprising:

a processor clock; and a serial clock derived by dividing the processor clock by a divisor, wherein the predetermined bit period is a first predetermined number of phases of the serial clock in length, and wherein the serial clock clocks the start bit logic, data bit logic, and stop bit logic.

22. The microcontroller of claim 21, further comprising:

a programmable divisor register for holding the divisor, wherein the divisor register is programmable by the execution unit.

23. The microcontroller of claim 21, wherein the bit period is 16 phases of the serial clock.

24. The microcontroller of claim 21, wherein the bit period is N phases of the serial clock, where N>1.

25. The microcontroller of claim 19, wherein the tuning logic is part of the stop bit logic.

26. The microcontroller of claim 25, further comprising:

a processor clock; and a serial clock derived by dividing the processor clock by a divisor, wherein the predetermined bit period is a first predetermined number of phases of the serial clock in length, and wherein the serial clock clocks the start bit logic, data bit logic, and stop bit logic.

27. A microcontroller, comprising:

an execution unit clocked by a processor clock;

means clocked by a serial clock divided from the processor clock for transmitting an asynchronous serial frame of data; and means for stretching the end of the asynchronous serial frame of data to more accurately match an ideal frame length.

28. A method for configuring an asynchronous serial port for transmitting asynchronous serial data from a microcontroller having a processor clock, a serial clock derived by dividing the processor clock by a divisor, and a tune register for stretch a stop bit, where the serial clock cannot be set to exactly yield a frame length that is the length of a frame at a desired baud rate, the method comprising the steps of:

determining for a desired baud rate the smallest divisor that will yield an asynchronous serial frame length that is shorter than the length of the frame at the desired baud rate;

programming the divisor as the determined smallest divisor;

determining a minimum number of additional units of time selectable in the tune register that when added to the asynchronous serial frame length result a stretched asynchronous serial frame length that is longer than the frame length of the desired baud rate;

programming the tune register as the determined minimum number of additional units; and sending asynchronous data.

29. The method of claim 28, wherein the additional units of time selectable in the tune register are each equal to one period of the processor clock.

30. The method of claim 28, wherein the additional units of time selectable in the tune register are each equal to one phase of the serial clock.

31. The method of claim 28, wherein the tune register is programmed via feedback from errors occurring during receipt of serial data.

* * * * *